United States Patent
Block et al.

(10) Patent No.: US 9,143,221 B2
(45) Date of Patent: *Sep. 22, 2015

(54) METHOD AND APPARATUS FOR IN-BUILDING COMMUNICATIONS

(71) Applicant: INTEROPERABILITY TECHNOLOGIES GROUP LLC, Reno, NV (US)

(72) Inventors: Robert S. Block, Reno, NV (US); Alexander A. Wenger, Melville, NY (US); Rene A. Stiegler, III, Mobile, AL (US)

(73) Assignee: INTEROPERABILITY TECHNOLOGIES GROUP LLC, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/952,882

(22) Filed: Jul. 29, 2013

(65) Prior Publication Data
US 2013/0309962 A1    Nov. 21, 2013

Related U.S. Application Data

(62) Division of application No. 12/000,202, filed on Dec. 10, 2007, now Pat. No. 8,498,570.

(60) Provisional application No. 60/873,571, filed on Dec. 8, 2006.

(51) Int. Cl.
*H04B 7/14* (2006.01)
*H04B 7/15* (2006.01)
*H04B 7/155* (2006.01)
*H04B 7/26* (2006.01)

(52) U.S. Cl.
CPC .............. *H04B 7/15* (2013.01); *H04B 7/15528* (2013.01); *H04B 7/2606* (2013.01)

(58) Field of Classification Search
CPC .... H04B 7/15; H04B 7/15528; H04B 7/2606; H04L 5/0005; H04L 5/0037; H04L 5/008
USPC ......... 455/15, 7, 9, 11.1, 13.1, 16, 17, 20, 22, 455/24, 41.2, 408, 450, 455, 3.05; 370/278, 370/279, 293, 274, 315, 492, 501; 375/211, 375/214
See application file for complete search history.

(56) References Cited

U.S. PATENT DOCUMENTS

| | | |
|---|---|---|
| 5,371,901 A | 12/1994 | Reed et al. |
| 2003/0158954 A1 | 8/2003 | Williams |
| 2004/0185794 A1 | 9/2004 | Jeong et al. |
| 2005/0025085 A1 | 2/2005 | King |
| 2005/0130589 A1 | 6/2005 | Weissman |
| 2008/0125038 A1 | 5/2008 | Yuval |

*Primary Examiner* — Shaima Q Aminzay
(74) *Attorney, Agent, or Firm* — Buchanan Ingersoll & Rooney PC

(57) ABSTRACT

A system for repeating radio signals to the outside of a structure, from transmitters operating within a structure that normally prevents radio transmissions from propagating out of the structure. A system for repeating radio signals to the inside of a structure, from transmitters operating outside a structure that normally prevents radio transmissions from propagating into the structure.

6 Claims, 8 Drawing Sheets

METHOD AND APPARATUS FOR IN-BUILDING COMMUNICATIONS

This application is a divisional of U.S. application Ser. No. 12/000,202, filed on Dec. 10, 2007, which claims priority of U.S. Provisional Application No. 60/873,571 filed on Dec. 8, 2006 under 35 U.S.C. §119(e), the entire contents of which are incorporated by reference herein.

BACKGROUND

When used within a structure such as an office building, modern cell phones and portable radios used by the public and by emergency first responders, i.e. police, fire, EMS, etc., have difficulty maintaining communications with base stations and other radios inside and outside of the building. The reason for poor communications in these structures is because they are customarily built with steel frames or reinforced concrete, which impedes the transmission of radio signals into or out of the structure. Poor cell phone performance is a typical complaint. Even more serious, when responding to an emergency in such a structure, this limitation on radio signal transmission has the potential to place the first responders and the occupants of the structure in great jeopardy.

The deployment of a system of radio repeaters connected by communications paths within the structure provides the solution to the problem of maintaining radio communications within structures that impede these signals. The repeaters support 2-way radio communication within a structure and between users inside the structure and users and networks outside of the structure.

In Building Communications (IBC) can be achieved by converting and coupling/decoupling the standard transmit and receive free space radio signals from radio users within the structure (occupants, first responders, etc.) to communication paths within the structure for distribution throughout the structure. As used in this document, communication path ("Comm Paths") can include any structure wiring (power mains, telephone wiring, network wiring, alarm wiring, fiber optics, or the like) and/or structural building elements (structural steel, plumbing, standpipes, elevator components, and the like) that support coupling and decoupling of communications signals to a Comm. Paths. As used herein, communication signals include, but are not limited to, radio frequency, acoustic, light, magnetic, or similar signals capable of being converted into intelligible signals. Comm. Path Signals are any communication signals traveling over a Comm. Path. One or more repeaters on the outside of the structure connected to one or more Comm. Paths are used to convert and couple/decouple radio transmissions between radio users inside the structure and radio users and networks outside the structure. An exemplary implementation of IBC would be a Broadband Over Powerlines (BPL) transmission (Comm. Path Signal) over power mains wiring (Comm. Path) in a structure.

SUMMARY

A system comprising a device for facilitating communication between communication devices, wherein the communication devices are located at different locations in the interior of a structure or at different locations around the exterior of the structure, the device including a receiver for receiving a signal having a first frequency either within the interior of a structure or at the exterior of a structure, converting the received signal to signal having an intermediate frequency. A Communication Path coupler provides for connecting to a portion of a structure, wherein the portion of the structure is a communication path over which the intermediate frequency signals can travel. A transmitter capable of converting intermediate frequency signals back to signals having the first frequency and transmitting the signal having the first frequency to communication devices is located at different locations in the interior of a structure or at different locations around the exterior of the structure.

A communication system including a first and second portable communication devices for receiving and transmitting signals having a first frequency. The devices include a receiver capable of receiving a signal having the first frequency either within the interior of a structure or at the exterior of a structure, converting the received signal to signal having an intermediate frequency. A communication path coupler connects to a portion of a structure, wherein the portion of the structure is a communication path over which the intermediate frequency signals can travel. A transmitter converts intermediate frequency signals back to signals having the first frequency and transmitting the signal having the first frequency, wherein the first communication device is located in the interior of the structure and the second device is located on the exterior of the structure.

BRIEF DESCRIPTION OF THE DRAWING FIGURES

Figure 4:
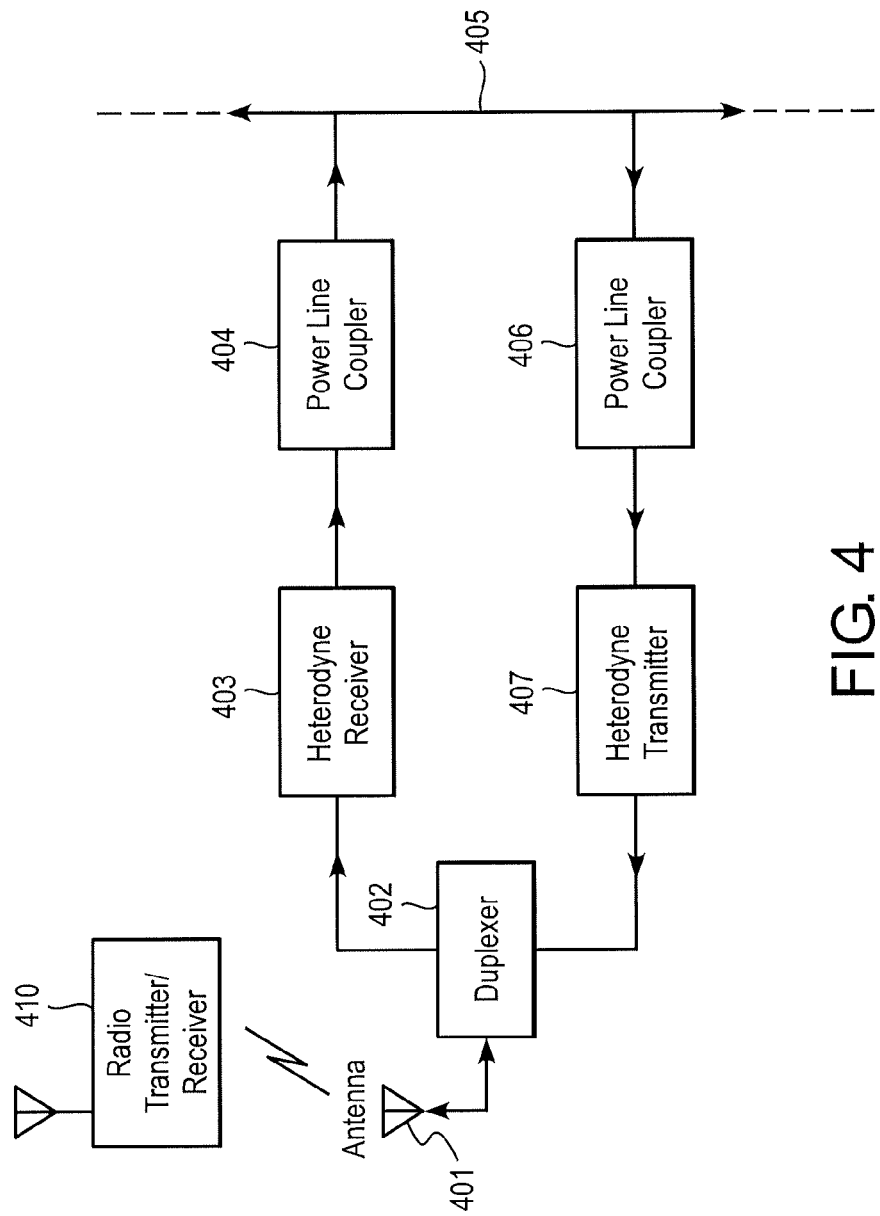

FIG. 4 shows an exemplary embodiment of a repeater that translates free space radio signals onto Comm. Paths. This repeater uses a duplexer to allow a common antenna for transmitting and receiving signals.

Figure 5:
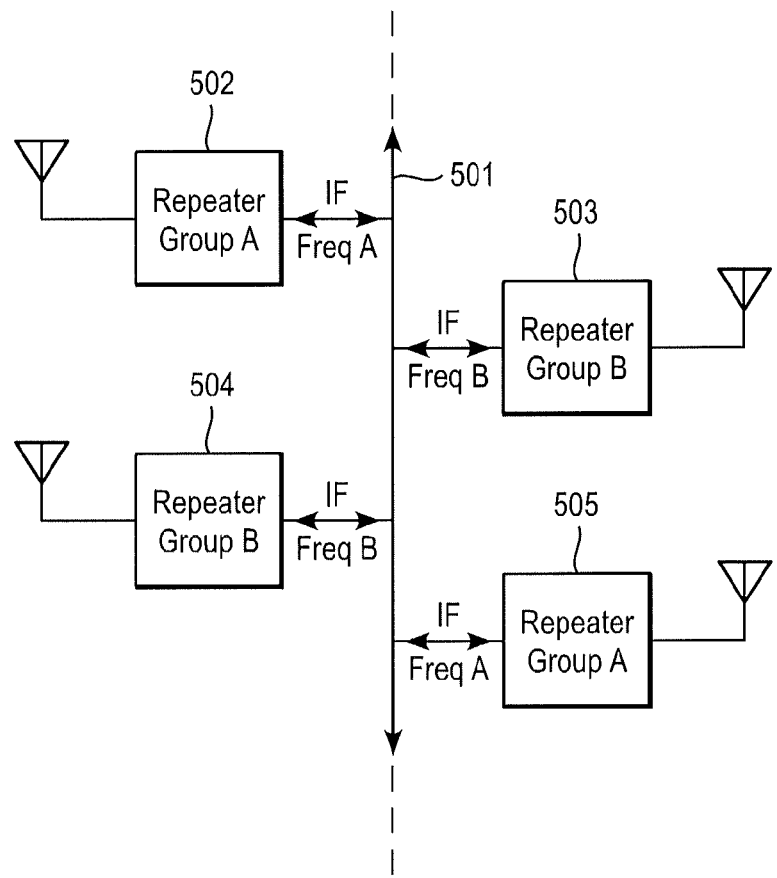

FIG. 5 shows an exemplary embodiment of a repeater system.

Figure 6:
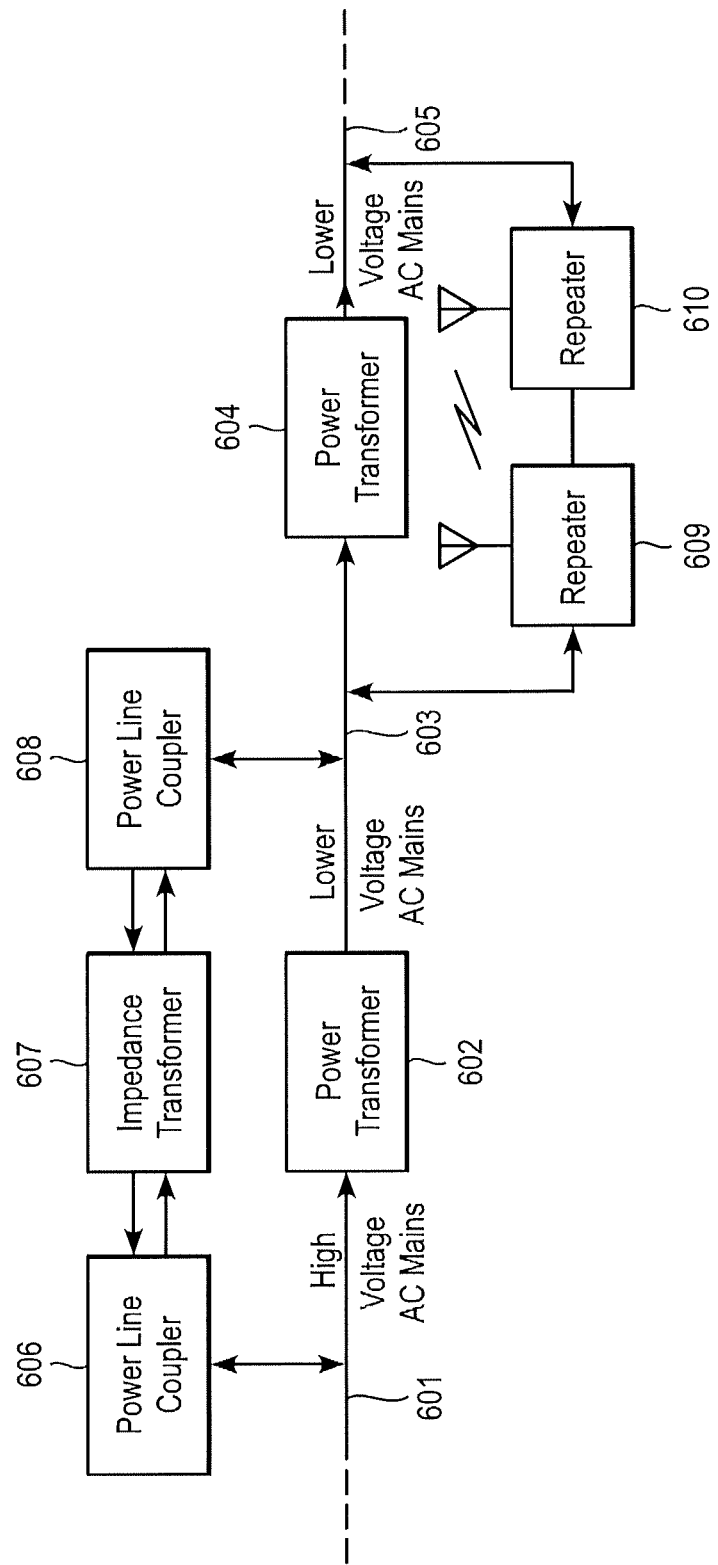

FIG. 6 shows two exemplary embodiments for bypassing impediments to the transmission of radio signals on Comm. Paths.

Figure 7:
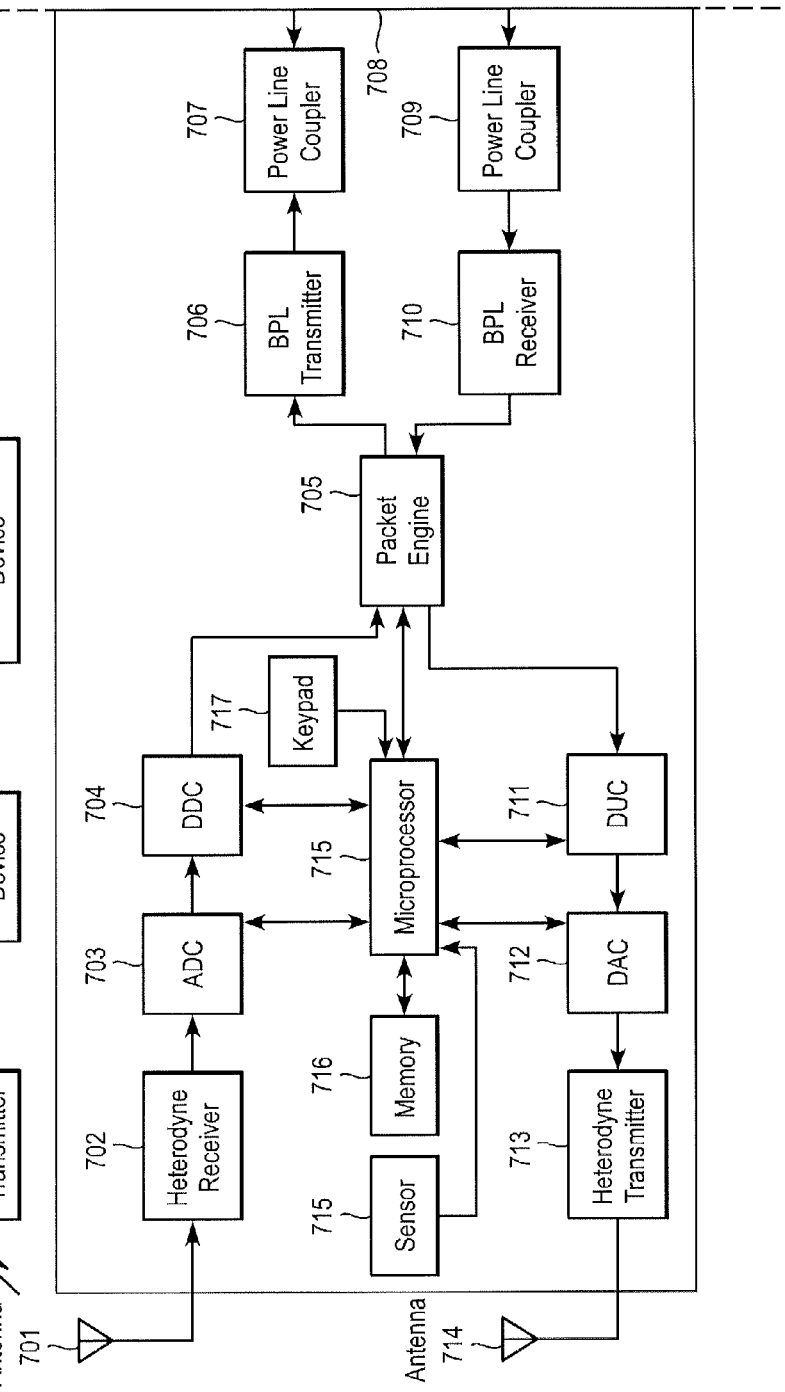

FIG. 7 shows an exemplary embodiments of a repeater that translates free space radio signals onto one or more Comm. Paths.

Figure 8:
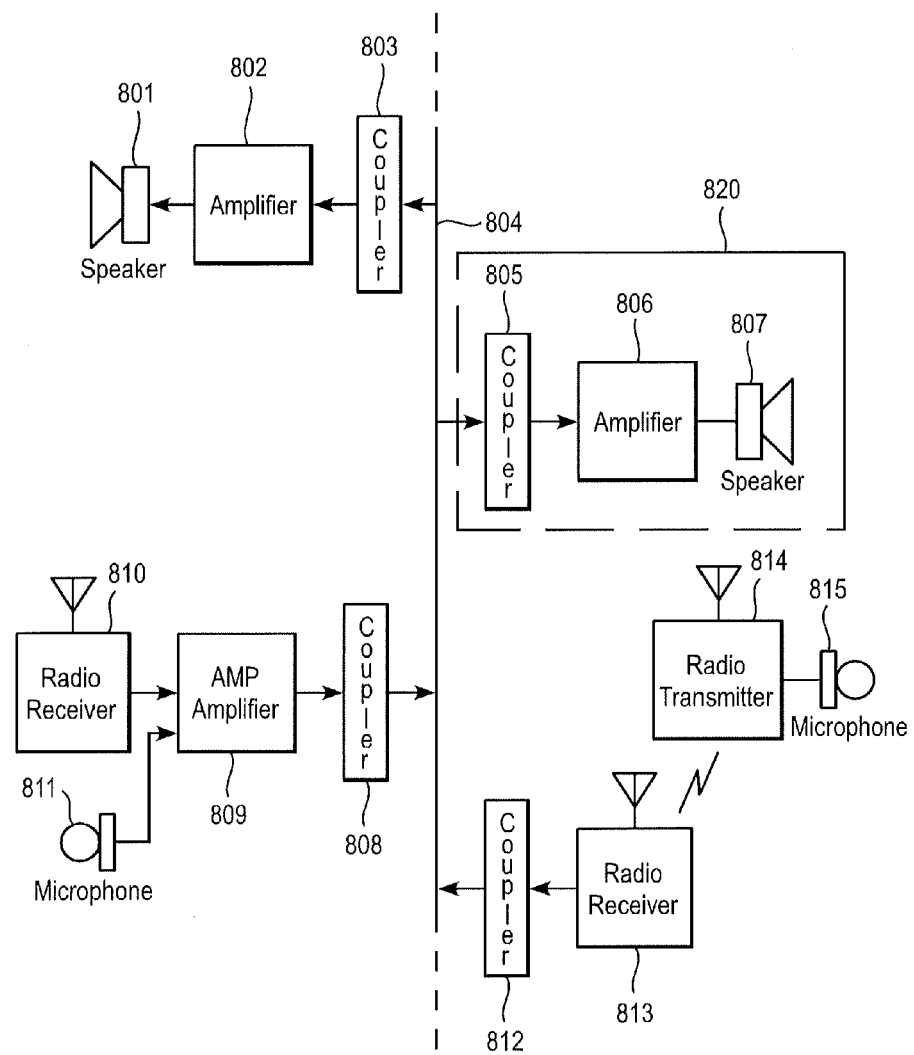

FIG. 8 shows another exemplary embodiment of a unidirectional repeater that translates free space radio signals onto one or more Comm. Paths.

DETAILED DESCRIPTION

Figure 1:
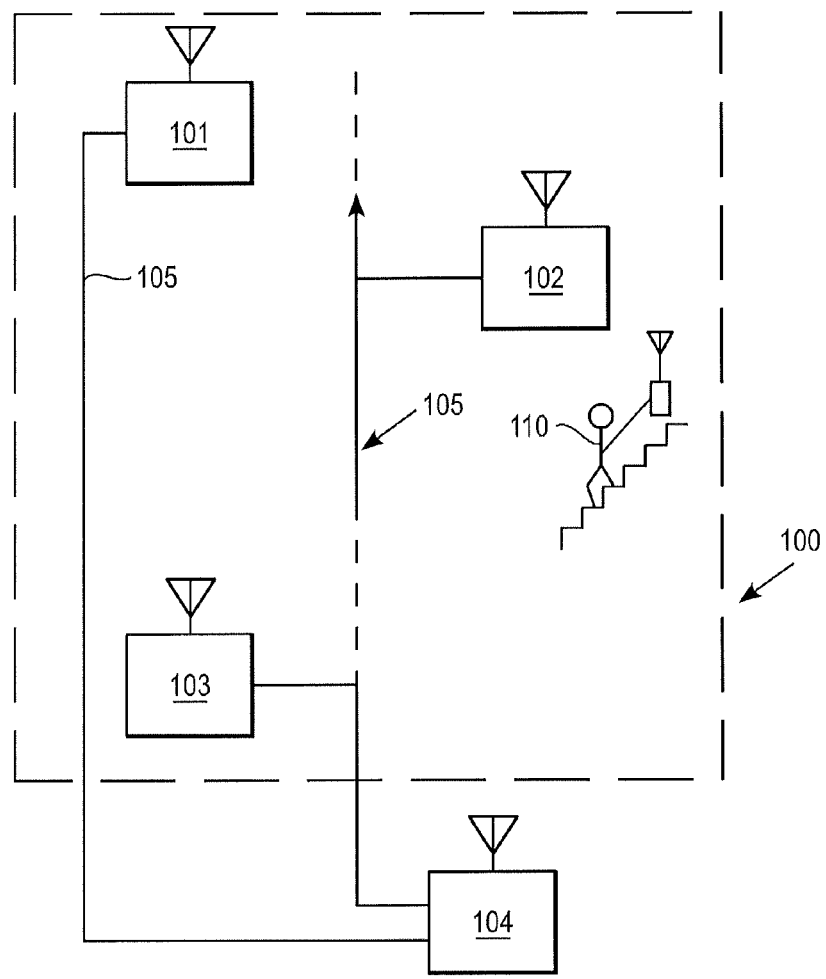
FIG. 1 shows communication signal repeaters within a structure.

FIG. 1 illustrates an exemplary embodiment, wherein a structure 100, that impedes radio transmissions, contains a plurality of radio repeaters 101, 102, that are connected to one or more Comm. Paths 105 within the structure 100. Of course, any number of additional repeaters as required or desired for reliability purposes can be used. A repeater outside of the structure 104 is also connected to one or more Comm. Paths.

Transmissions from radios outside of structure 100 are received on repeater 104 and converted to Comm. Path compatible signals that are then coupled into one or more Comm. Paths. All repeaters inside the structure 101 receive the Comm. Path radio signals and convert them back to a free space radio signals that can be detected inside the structure. Conversely, free space radio transmissions from any first responder 110 in the structure are received on a repeater such as 101 and converted to Comm. Path compatible signals that are coupled to one or more Comm. Paths 105.

Figure 2:
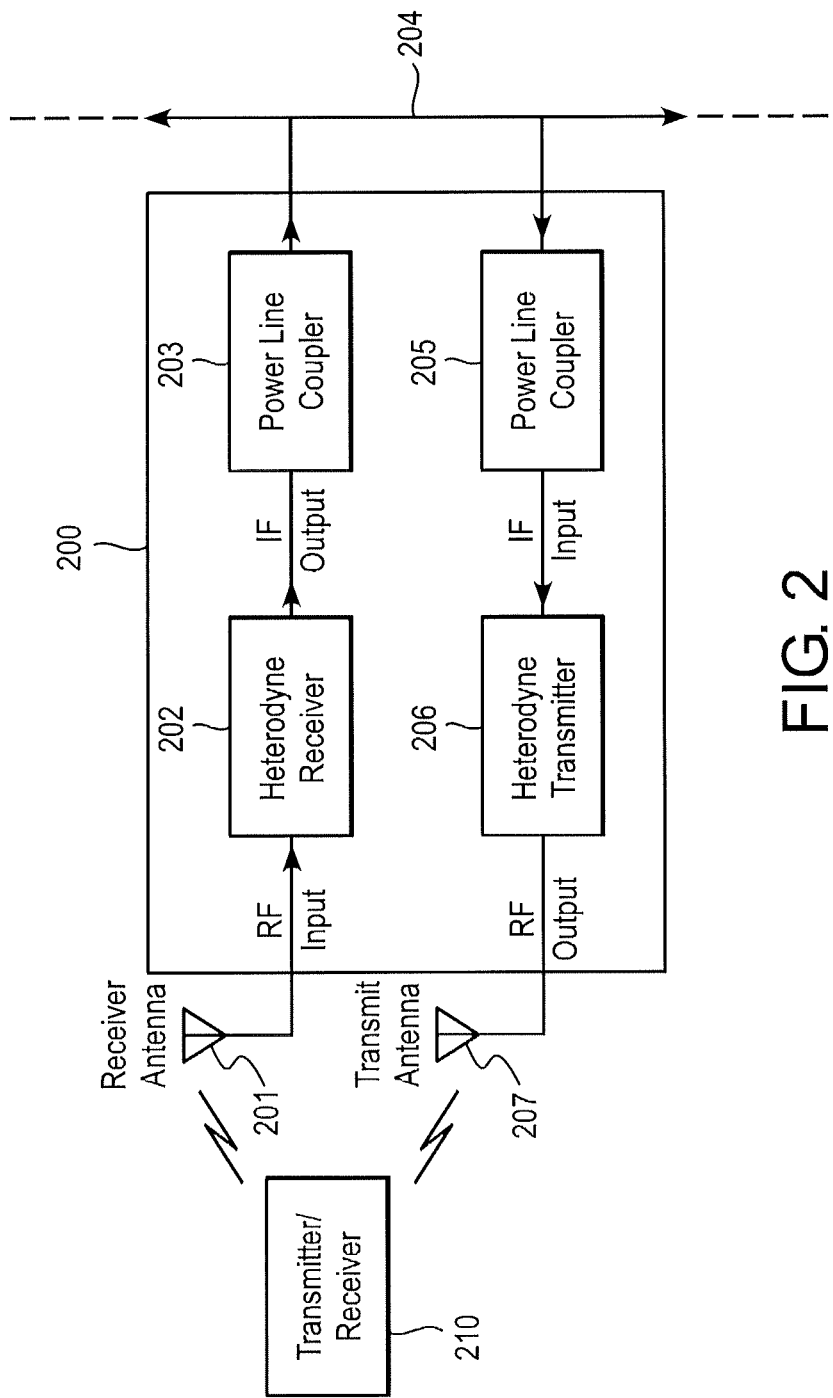
FIG. 2 shows an exemplary embodiment of a repeater that translates free space radio signals onto Comm. Paths.
Figure 3:
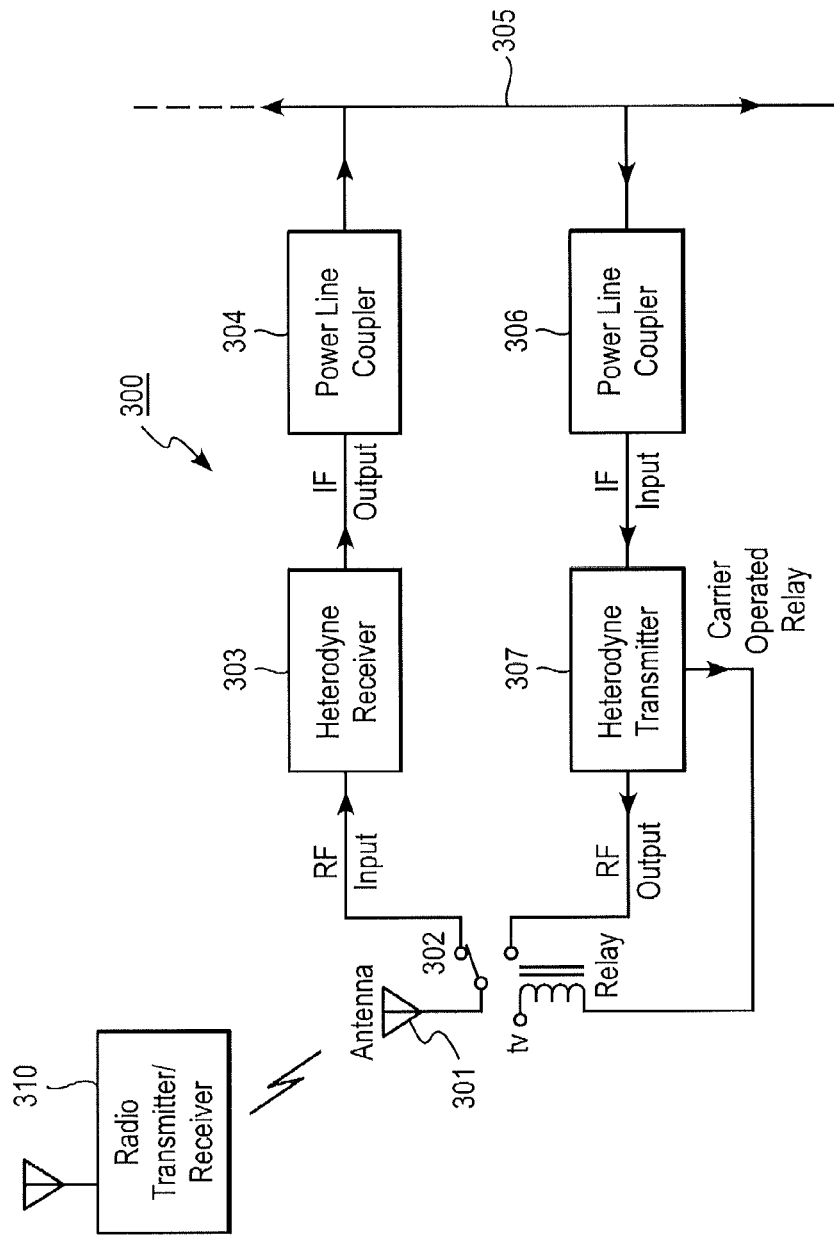
FIG. 3 shows an exemplary embodiment of a repeater that translates free space radio signals onto Comm. Paths.

FIGS. 2, 3 and 4 are exemplary embodiments of a carrier current or BPL variant of the present invention.

In the repeater 200 of FIG. 2, a receiver antenna 201 receives signals from a radio transmitter. This repeater 300 uses separate antennas for transmitting and receiving signals. The received radio signal is connected to a radio receiver 202, amplified and converted to a lower intermediate frequency. The output of radio receiver is fed to power line coupler 203. The power line coupler 203 injects the intermediate frequency signal into power line 204. Similarly, an intermediate frequency signal from power line 204 can be passed to the input of transmitter 206, for example, a heterodyne transmitter, by means of the power line coupler 205. The intermediate frequency is up converted and amplified by the transmitter 206. The transmit radio signal is fed to transmit antenna 207.

In the repeater of FIG. 3, this repeater 300 uses a common antenna 306 for transmitting and receiving signals. Relay 302 can be used to determine whether the repeater 300 is in the transmit or receive mode of operation. An antenna 301 receives signals from a radio transmitter 310. The received radio signal is connected to radio receiver 303 thru relay 302, amplified and down converted to a lower intermediate frequency. The output of receiver 303, for example a heterodyne receiver, is fed to power line coupler 304. The power line coupler injects the intermediate frequency signal into power line 305. Similarly, an intermediate frequency signal from power line 305 can be passed to the input of radio transmitter 307 by means of the power line coupler 306. The presence of a minimum transmit signal level causes the COR (carrier operated relay) output of the transmitter to activate relay 302, connecting the antenna 301, to the transmitter 310 output. The COR relay can be activated by determining that a radio carrier signal is present or by means of a VOX audio presence detector. The intermediate frequency is up converted and amplified by heterodyne transmitter 307.

In the repeater of FIG. 4, an antenna 401 receives signals from a radio transmitter 410. The received radio signal is passed to receiver 403 thru duplexer 402, amplified and converted to a lower intermediate frequency. The output of receiver 403 is fed to power line coupler 404. The power line coupler 404 injects the intermediate frequency signal into power line 405. Similarly, an intermediate frequency signal from power line 405 can be passed to the input of radio transmitter 407 by means of the power line coupler 406. The intermediate frequency is up converted and amplified by the radio transmitter 410. The transmit radio signal is fed to the antenna 401 thru duplexer 402.

In FIG. 5, Group A repeaters 502 and 505 can use, for example, intermediate frequency band A, while repeaters 503 and 504 can use, for example, intermediate frequency band B. Although, it does not matter which repeaters repeats which intermediate frequency band. Intermediate frequency bands A and B are sufficiently separated in frequency such that filters in the radio transmitter and radio receiver are able to prevent mutual interference between the repeater elements of group A (502 and 505) and the repeater elements of group B (503 and 504).

In FIG. 6, the Comm. Paths 601, 603 and 605, operate at 3 different voltages. Power transformers 602 and 604 are step down transformers which typically block radio signal transmissions on mains power lines. FIG. 6 shows, for example, two means of bypassing the power transformers. Of course, other suitable bypass means can be used.

In the first case, power line coupler 606 is connected to a high voltage power line 601. Power line coupler 606 is also connected to an impedance transformer 607, which is in turn connected to power line coupler 608, on the low voltage side of transformer 602, thus creating a path for the radio signals on mains power line 601 to bypass transformer 602 and be coupled onto mains power line 603.

In the second case, repeater 609 is connected to power line mains 603 and repeater 610 is connected to power line mains 605. These repeaters may use free space radio signals to couple the power line mains signals between power lines mains 603 and 605, and thus bypass transformer 604. Alternatively, repeaters 609 and 610 can use other modalities to communicate with each other, such as optical coupling, capacitive coupling, inductive coupling, and the like.

In the case of multiphase power line wiring, couplers such as the ones shown in FIG. 6 would need to be connected for each wiring phase.

In the repeater of FIG. 7, a receiver antenna 701 receives signals from a radio transmitter 720. The received radio signal is connected to radio receiver 702, amplified and converted to a lower intermediate frequency. The output of the radio receiver 702 is fed to an analog-to-digital converter (ADC) 703, which digitizes the analog input signal at a rate that meets or exceeds the Nyquist sampling criterion. The digital output of the ADC 703 is sent to a digital down converter (DDC) 704 to limit the bandwidth and data rate. The output of the DDC 704 is connected to a packet engine 705, which takes the raw data and converts it to packets for the purposes of transmission by means of BPL transmitter 706. The output of the BPL transmitter 706 is coupled to the mains power wiring 708, by power line coupler 707. In the other direction, BPL signals on the mains power wiring 708, are coupled to BPL receiver 710 by power line coupler 709. The data packets recovered by the BPL receiver are fed to the packet engine for conversion from packets back to raw data. The raw data is sent to a digital up converter (DUC) 711 and from there to a digital-to-analog converter (DAC) 712. The analog signal output of the DAC 712 is fed to heterodyne transmitter 713, which converts the signal to a free space radio signal by means of antenna 714. Analog signals enter the ADC 703 and leaving the DAC 712 must be filtered to prevent aliasing and limiting bandwidth.

A microprocessor 715 can receive control commands from a remote device 730. The control information may be stored in memory 716. The control information can be used to change various performance characteristics of the repeater 700, such as center frequency, transmit amplitude, or other characteristics. Similarly, information about the condition of the repeater 700 may be sent to a remote monitoring device 740. The remote monitoring device 740 can use the information provided to determine reliability schedule maintenance or the like. The repeater 700 can also be controlled locally via keypad 717. A sensor 718, connected to the microprocessor, can be monitored remotely to evaluate critical safety parameters such as temperature, and the like.

FIG. 8 illustrates an exemplary embodiment of a system comprising a radio receiver 810 or a microphone 811 can be used as a source of an audio signal for amplification by amplifier 809. The output of the amplifier 809, the Comm. Path Signal, is sent to a transmit coupler 808, an audio transducer that is attached to or is formed from an element of the structure that forms Comm. Path 804. At the receive only (RO) repeater 820, the Comm. Path Signal is detected by a Comm. Path receive coupler 805, which can be an audio transducer. The output of coupler 805 is fed to a receive amplifier 806, and the output of the amplifier 806 drives loudspeaker 807. Other RO repeaters can be deployed throughout the structure. The audio signal is broadcast on the IBC Comm. Path, consequently all the loudspeakers will emit the same audio signals simultaneously.

Another example of connecting to the same IBC Comm. Path is represented by the signal path formed by microphone 815, radio transmitter 814, radio receiver 813, which can have a built-in audio amplifier capable of driving a transmit coupler, and Comm. Path transmit coupler 812. A suitable microphone, for example, is one that produces an audio output signal with a very high signal-to-noise ratio, such as a bone conduction microphone. The transmitter and receiver could be Bluetooth compliant devices or some similar types of devices having both wired, wireless or both capabilities.

FIG. 9 illustrates an exemplary embodiment comprising ultrasonic devices. A free space radio repeater 901 converts free space radio signals received from either a remote transmitter to a building structure or within a building structure, to an intermediate frequency signal. The intermediate frequency signal is fed to an ultrasonic transceiver 902, which in turn sends its' output, the Comm. Path signal, to a ultrasonic coupler 903, that is attached to an element of the building structure that forms a Comm. Path 904, which is coupled to the building structure 904. The Comm. Path signal is detected on the Comm. Path 904 by ultrasonic coupler 910. The output of ultrasonic coupler 910 is sent to the input of ultrasonic transceiver 909. The output of ultrasonic transceiver 909 is connected to the input of radio repeater 908, which converts the signal to a free space radio signal again.

The digital repeater implementation outlined in FIG. 7 has added costs and benefits. The SDR based repeater is more complicated and expensive to build, however, it's benefits include digital stability over temperature variations and time, and other benefits, and precise digital control for selection of the repeater center frequency and bandwidth.

In FIGS. 2, 3, 4 and 7, the radio receiver and radio transmitter may be configured to share a common power line coupler (e.g., Comm. Path coupler).

In another embodiment, a first responder can carry a repeater into a structure, connect the repeater into a Comm. Path outlet (e.g., a power mains outlet), and maintain contact with radios outside of the structure. If batteries are used as a supplementary power source for the repeaters, the repeaters will continue to operate even if the structure's main power is shut off. When power lines are used as the Comm. Paths in structures that have power transformers to assist with power distribution, a transformer radio signal bypass means can be installed, although it is not necessary.

Repeaters may be hardwired to the Comm. Paths where it is economically attractive or where local or national electrical codes mandate such a connection.

Repeater systems such as the ones outlined may be applied to many free space radio based services, including cellular telephone service, 802.11 Wi-Fi Ethernet and 802.16 WiMAX Ethernet, and the like.

The content of the radio transmissions facilitated by the repeaters may be audio, video or data.

Repeaters may, as necessary, demodulate signals, process the demodulated signals, and remodulate signals.

As noted previously, structure Comm. Paths other than the main power lines can be used to carry the converted radio signals of repeaters. Some examples of such alternate wiring are telephone system wiring, alarm system wiring, data network wiring, coaxial cable, fiber optic cable, and the like. Furthermore, metallic structural elements could also be used to transport repeater signals.

The specific modulation techniques, frequencies, data rates, and so can be optimized for the specific Comm. Path(s) selected. While BPL has been referenced in this disclosure, it is not intended to limit the invention to any specific signal characteristics or Comm. Path conversion and coupling procedures

What is claimed is:

1. A system comprising a device for converting free space radio transmissions to signals on communication paths, the device comprising:
    a radio receiver configured to convert received free space radio signals to at least one of an audio signal and a local microphone audio signal source;
    a transmit audio amplifier;
    an audio communication path transmit coupler;
    an audio communication path receive coupler;
    a receive audio amplifier; and
    a loudspeaker,
    wherein at least one of the audio communication path transmit coupler and the audio communication path receive coupler are arranged as a fixed internal construction component of a building structure.

2. A system comprising a device for converting free space radio transmissions to signals on communication paths, the device comprising:
    a radio repeater configured to convert received free space radio signals to an intermediate frequency signal, and converting an intermediate frequency signal to a transmitted free space radio signal;
    an ultrasonic transceiver configured to transmit and receive intermediate frequency signals; and
    an ultrasonic communication path coupler arranged as a fixed internal construction component of a building structure, the ultrasonic communication path coupler being configured to couple the radio repeater to the ultrasonic transceiver to communicate the intermediate frequency signals there between.

3. A system comprising a device for facilitating communication between communication devices, wherein the communication devices are located at different locations in the interior of a structure or at different locations around the exterior of the structure, the device comprising:
    a receiver for receiving a signal having a first frequency either within the interior of a structure or at the exterior of a structure, and for converting the received signal to a signal having an intermediate frequency;
    a communication path coupler for connecting to a fixed internal construction portion of the infrastructure of a building structure, wherein the fixed internal construction portion of the building structure is a communication path over which the intermediate frequency signals can travel; and
    a transmitter configured to convert intermediate frequency signals back to signals having the first frequency and transmitting the signal having the first frequency to communication devices located at different locations in the interior of a structure or at different locations around the exterior of the structure.

4. The system according to claim 3, comprising:
    a radio carrier detection circuit configured to control a relay that connects to at least one of an input of the receiver and an output of the transmitter.

5. The system according to claim 3, comprising:
    a voice signal detection circuit configured to control a relay that connects an antenna to at least one of an input of the receiver and an output of the transmitter.

6. The system according to claim 3, wherein different groups of signals having the first frequency are simultaneously coupled to one or more communication paths.

* * * * *